Figure 1:
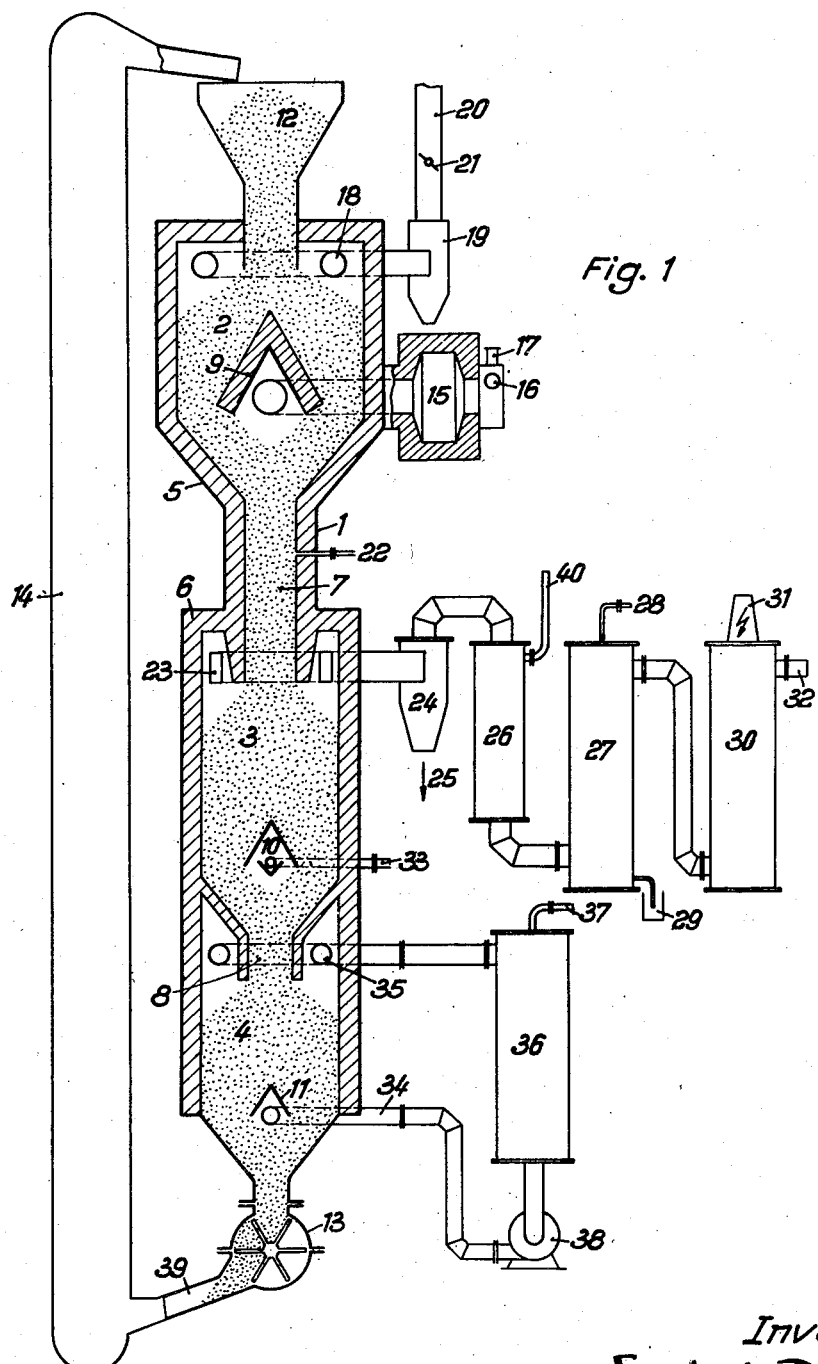

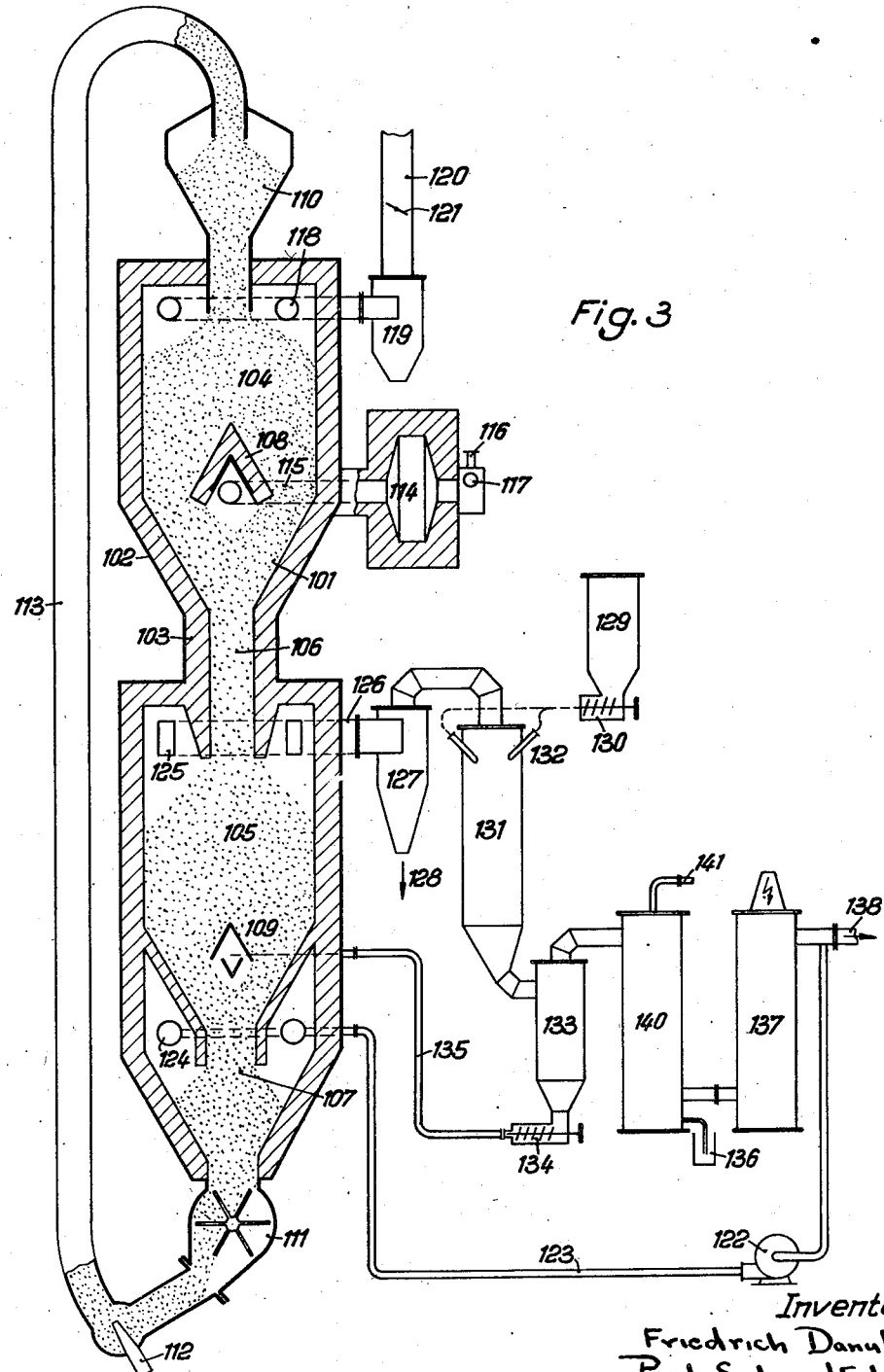

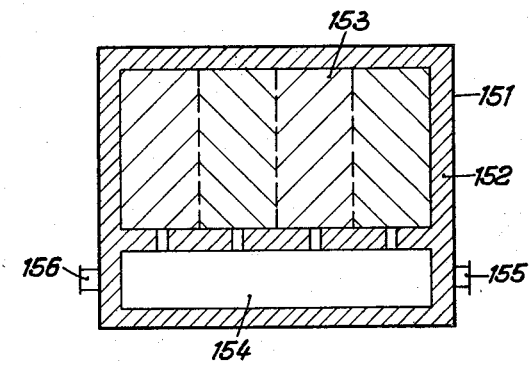
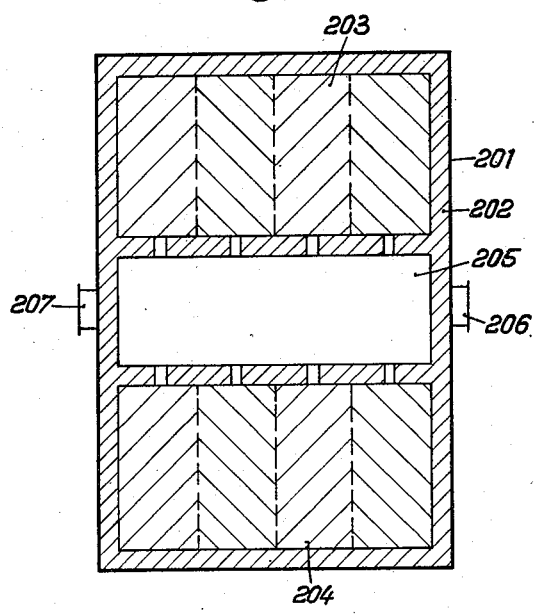

2,701,758

THERMAL PROCESSES

Friedrich Danulat, Frankfurt am Main Eschersheim, and Paul Schmalfeld, Bad Homburg vor der Hohe, Germany, assignors to Metallgesellschaft Aktiengesellschaft, Frankfurt, Germany, a German corporation Application July 6, 1950, Serial No. 172,342

Claims priority, application Germany July 9, 1949

1 Claim. (Cl. 48—206)

The invention relates to processes in which finely granular or pulverulent solid substances or mixtures of substances are moved by or suspended in gases or vapors while heat is introduced or carried off. These heat exchanges may be accompanied by a simultaneous conversion of substances caused by endothermic or exothermic chemical reactions or the like. For the sake of brevity these processes are hereafter designated as "thermal processes." They may take place at any suitable temperature. The invention may, for example, be used for the degassing of pulverulent combustibles, for drying organic or inorganic substances, for condensations, during which pulverulent or finely granular solid bodies are present or are produced, or for catalytic hydrogenation processes as, for example, the hydrogenation of carbon monoxide to hydrocarbons and oxygen containing hydrocarbon derivatives under the influence of, for example, nickel, cobalt or iron catalysts or the like, in which case the catalyst is used in finely granular and mobile state, or for other similar processes.

The invention will be explained by way of example by the gasification of a pulverulent solid fuel. With this kind of gasification one distinguishes between suspension gasification and "fluidized" gasification. Both kinds may merge into each other depending on the prevailing flowing conditions.

The suspension gasification and the fluidized gasification are currently preferably carried out by using oxygen as gasification agent in order to produce in this way a water gas-like gas poor in nitrogen in a continuous process.

Depending on the speed and the specific weight of the gases and their load of finely granular or pulverulent solid material, and on the size of the granules and the specific weight of the material the substances may be carried by the gas through the reaction chamber in a continuous stream or in a fluid-like state, as is the case, for example, with the Winkler gasification or with the "fluidized" technique which is used, or may be used, for the catalytic cracking of oil vapors, for the hydrocarbon synthesis, or also for coal gasification.

With suspension gasification in which the combustible is carried in a continuous stream with the gas through the reaction chamber the gas temperature at its exit from the reaction chamber is mainly dependent on the composition and the temperature of the gasification agent used, and on the reacting capability of the combustible, and according to practical experience is between approximately 750 and 1200° C. With fluidized gasification the exit temperature of the gas is about at the same height.

While with the "fluidized" gasification in practical operation a favorable heat exchange and substance conversion is achieved because due to the turbulence of the current high relative speeds between the fuel and the gas are attained and thus an intensive exchange of heat and substance, it has been found, that with suspension gasification this exchange is imperfect. The difference between the speeds of the gas and the combustibles is rather small in this case, and the heat exchange and the substance conversion is mainly effected by diffusion which, however, is insufficient, so that the reaction equilibrium is very far from being attained, and residues rich in coal remain. With the "fluidized" gasification a violent intermixture of the fuel with ashes takes place and thus an enrichment of the combustible bed with ashes so that a high content of combustibles in the discharged ashes as well as in the residues discharged with the gas has to be taken in account.

Therefore both processes suffer from the common disadvantage of a low degree of efficiency of the carbon conversion and high gas exit temperatures resulting in a high oxygen consumption.

It has been tried to overcome the difficulties experienced with suspension gasification by the following measures:

1. Increasing the time the dust stays in the gasification chamber by means of carrying out the gasification in an ascending gas stream; in a coneshaped reaction chamber; by separation and reconduction of the ungasified dust; and finally by arranging several cycles of circulating combustibles in series.

2. Decreasing the gasification time by increasing the relative speed between the dust and the gasification agent as, for example, by high blasting-in speeds or by whirling the gas through curved conduits.

3. Arranging a gasification process and a combusting process in series, i. e. the separation of the ungasified dust and its combusting in a coal dust firing. (Gumz: Kurzes Handbuch der Brennstoff- und Feuerungstechnik, Abschnitt Staubvergasung.)

In order to ensure a complete burning of the combustible one has finally employed very high reaction temperatures by means of direct combustion with pure oxygen, followed by the reaction with highly superheated steam. (Industrial and Engineering Chemistry, vol. 40, April 1948, p. 559 etc.) Although hereby a favorable conversion of carbon may be attained there is still a higher oxygen consumption than with the conventional gasification with lumpy combustibles in fixed fuel bed due to the high exit temperature of the gases. The oxygen produced, for example, by the Linde process from air, is despite the advanced technique still an expensive gasification agent both with regard to the expenditure required for the erection of the plant and the operating expenses.

Since the gasification of dust has indisputable advantages as compared with that of solid lumpy combustibles, especially when using cheap finely granulated combustibles, it has been tried for a long time to develop a continuous water gas process for dust coal without the use of additional oxygen.

In the well-known process using "fluidized" technique (Gas Journal September 17, 1947, p. 617) the heat requirements of the reaction are met by circulating excessive quantities of heated combustibles, as coke. The intensive intermingling of combustibles and ashes impairs, however, the gasification reaction and lowers the efficiency of this process, too.

In other known processes, e. g. in the heating of a gas to high temperatures, or in the coking of coal, or in the cracking of oil, the heat required is supplied by a solid heat carrier. According to another conventional method in the upper part of a shaft furnace a heat carrier consisting of a suitable ceramic material was heated to high temperatures by means of hot combustion gases and then conveyed to a lower lying part of the shaft furnace into which oil was injected for the purpose of cracking.

The technique of thermal processes is now essentially enriched and enlarged by the process according to the present invention which is especially suitable for the gasification or the degassing of pulverulent or finely granular combustibles. According to the new process the gas charged with pulverulent or finely granular material is conveyed through a chamber which is filled with a continuously moving heat carrier preferably circulating in a cycle. The heat carrier which is conducted through the chamber may, for example, consist of metal or a ceramic material. It is selected in such a way that for the purpose of a simultaneous or a subsequent separation from the gas or other material to be treated its behavior in the flowing gas is entirely different from that of the material to be treated. Dependent on the speed and the specific weight of the gas and the behavior in the streaming gas of the material to be treated, which depends on the size of its granules and its specific weight, the material may be present in the gas in a suspended or in a fluid-like state, while the heat carrier passes through the treating chamber either continuously in a compact layer or sinks loosely down in a loosely connected stream through the bubbling bed of material to be treated, since it naturally obeys the law of gravitation and is hardly or only very little influenced by the streaming of the gas. The movement of the heat carrier may, however, also be influenced by the streaming of the gas if both (material and heat carrier) behave like fluids but in spite of that behave differently in the streaming gas depending on the size of their granules and their specific weight, so that a separation of the two substances from each other is possible in the same process or a separate succeeding one.

A heat carrier formed of fireproof material or metals having a granule size of the order of magnitude of about 5 to 30 mm. largest cross sectional diameter, for example, 12 to 15 mm. is, for instance, heated by hot gases in a closed chamber. The hot heat carrier is then conveyed into a second chamber through which a stream of gases flow carrying the solid finely granular or pulverulent material to be treated. Under loss of heat on the part of the heat carrier the intended thermal process for the treatment of the solid material added to the gas is carried out. The cooled down heat carrier hereafter leaves this chamber and is expediently led back to the first chamber and kept circulating in a cycle.

Rather surprisingly it has been found that the passage of the mixture of gas and solid fine material takes place very uniformly so that a uniform heat transmission and on account of the high turbulence of the stream an intensive interchange of material and heat may be attained. Separation of the solid material within the heat carrier layers which might impede the streaming did not occur. With processes during which chemical reactions take place between the gases and the entrained fine solid material the conversion of the material during these reactions takes place at high speeds.

It has further been found that the coarser particles of the solid fine material stay a considerably longer time in the interstitional volume of the heat carrier and in the free space above the latter than the finer particles. This is advantageous because the coarser particles are in this way subjected to a more intense treatment than the finer ones, and remain, for example, during the gasification long enough within the heat carrier to be partially disintegrated. The treatment may also be continued in a chamber into which the mixture of gas and solid material flows from the heat carrier layer in the shape of a "fluidized" bed.

Instead of heating the to be treated mixture of gases and solid fine material by a heat carrier a cooling may also be carried out in such a way that the heat carrier enters the treating chamber in a cooled state, takes up heat therein, is discharged, and returns after another cooling to the treating chamber.

The passage of the heat carrier through the treating chamber may, for example, take place in a vertical, an inclined, or a horizontal direction. The gas charged with fine solid material may pass through the heat carrier stream in a continuous, a countercurrent, or a transverse stream. With the continuous passage of the stream according to the invention a relative movement between the heat carrier and the gas is maintained.

The heating up of the heat carrier may also be effected by the process of the present invention, for example in such a way that combustible dust and air are conducted directly through the heated downward moving layers of the heat carrier in such a manner that the reaction takes place within these layers. The chambers for the heating and the cooling of the heat carrier and those for the conveying of gases and solid fine material through the heat carrier may be arranged superposed or juxtaposed in any desired way.

Any utilizable heat or cold still remaining in the heat carrier after the termination of the treatment may be utilized in a third chamber for other purposes, especially such which are carried out in connection with the process of the invention as, for example, the heating or cooling of gases taking part in the process; the production of steam; the superheating of steam, or the like.

The mixture of gases and solid fine substances may also be arranged in the reaction chamber in the form of a "fluidized" bed through which the heat carrier is conveyed. The flowing of the gas in the fluidized bed and the heat carrier may also be selected in such a way that the heat carrier behaves therein like a fluid. The heat carrier may afterwards be separated in settling chambers inside or outside of the fluidized bed from the mixture of gas and solid materials.

The process may be carried out under any suitable pressure as, for example, even under a pressure of 20 atms. or more. Such a pressure would, for example, be appropriate if an intended chemical reaction is favored by such a pressure. E. g. the gasification of fuel may be advantageously carried out under a pressure of more than 5 atm. for instance 20 to 30 atm. In this case the working under pressure favors the formation of methane and a gas with high calorific value of about 450–500 B. t. u./lb. can be produced. The hot exit gas under pressure may subsequently, for example, be utilized for the production of energy by expanding it in a turbine to atmospheric pressure.

In contradistinction to the conventional processes the process according to the present invention offers the following advantages:

Favorable turbulence of the to be treated finely granular or pulverulent material and the gases; high relative speeds between the gas, the solid pulverulent material and the heat carrier; high conversion of material; intensive transmission of heat especially at chemical reactions; appropriate heat transmission within a closed thermal process by means of which it becomes possible to reduce the final temperatures of the process and to utilize the thus liberated heat again for the process itself; high specific production; high efficiency.

Figure 2:
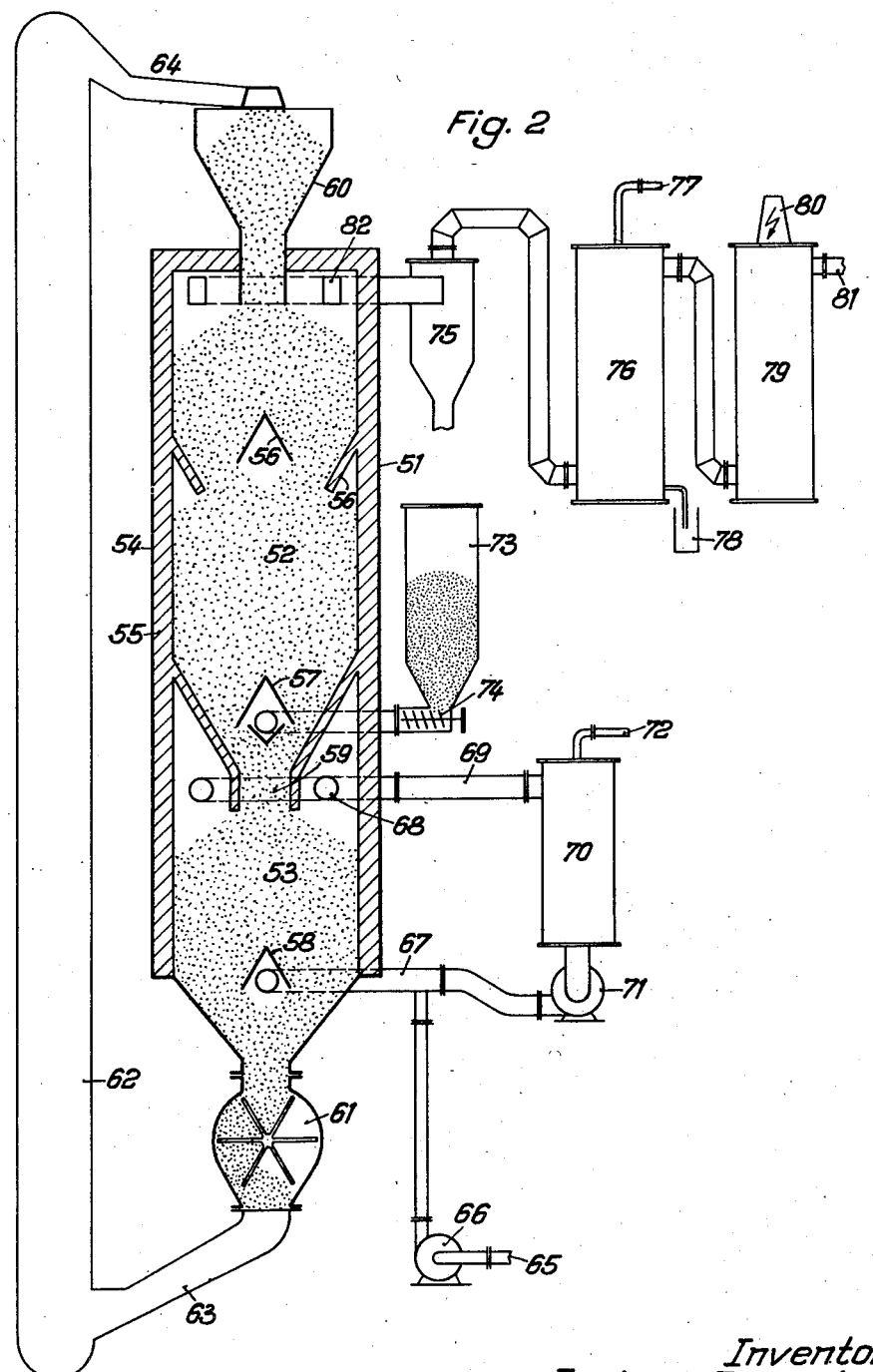

The invention will now be more fully explained by some examples. The apparatus suitable for carrying out the process described in the examples are diagrammatically and by way of example illustrated in the accompanying drawings. Fig. 1 shows a vertical section of an apparatus for the production of water gas or for the production of a similar gas for which a gasification agent is employed. Fig. 2 shows an apparatus in vertical section for the production of a similar gas in the same way but employing a gasification agent to which oxygen is added. Fig. 3 is a vertical section of a suitable apparatus useful for the degassing of combustibles. Fig. 4 is a diagrammatic representation in cross section of a furnace illustrating four compartments, and Fig. 5 is a diagrammatic representation in cross section of a double shaft furnace with four compartments each.

*Example 1*

The apparatus which is used for the continuous production of water gas from finely granular or pulverulent combustibles according to the invention comprises a vertical rectangular shaft 1 subdivided into the heating zone 2, the gasification zone 3 and the vaporization zone 4. The shaft is encased by a gas-tight outer shell of sheet metal 5 and has an inner lining of refractory brickwork 6. Between the upper heating zone and the gasification zone situated below it the shaft is constricted. This constriction 7 has the purpose of preventing the flowing of gases from one zone into the other as much as possible. A further constriction 8 in the lower part of the shaft separates the gasification zone 3 from the vaporization zone 4. Rooflike installations 9, 10 and 11 are provided inside of the shaft 1 for the purpose of the introduction of combustion gases, coal dust and steam. The ceramic material serving as heat carrier consists of grains or pieces of as uniform a size as possible as of order of magnitude of about 5 to 30 mm., for example, 8, 12 or 25 mm. largest cross sectional dimension. It is fed into the hopper 12 at the top of the vertical shaft at a temperature of, for example, 300° C. to 500° C. By the burning of combustibles in a gaseous, liquid, or pulverulent state the material is heated up to, for example, 1200 to 1300° C. while passing through the zone 2. The combustion and heating up may also be carried out in steps or stages in order, for example, to avoid undesirably high maximum temperatures.

In the following zone 3 the heat carrier transfers the absorbed heat, or part of it, to the gas and to the combustible to be gasified. After termination of the gasification process and a delivery of heat in the zone 4 the heat carrier is discharged at the lower end of this zone, for example, by means of a bucket wheel 13, from where it is conducted to a bucket conveyor 14 which transports it back to the hopper 12.

The heating chamber 2 communicates through a suitable conduit which ends under the roof-like installation 9 with the combustion chamber 15 in which the hot combustion gases required for heating up the heat carrier are produced. The air for the combustion is introduced to the burner at 16 and at 17 the combustible. The hot gases that flow at a temperature of, for example, 1300° C. from the combustion chamber through the roof-like installation 9 into the shaft and there upward in countercurrent to the descending heat carrier, heat up the latter to such an extent that the material on leaving the heating chamber and entering the constricted region 7 has the desired temperature of, for example, 1200° C. The heating gas is hereby cooled down to a temperature somewhat above the entering temperature of the heat carrier which is, for example, approximately 300 to 400° C. It leaves the heating chamber through openings 18, is conveyed through a conduit to the dust separator 19, and from there to a smoke stack 20 in which by means of an inserted butterfly valve 21 the pressure in the upper part of the shaft is regulated in such a way that practically no combustion gases flow through the hopper 12.

In order to prevent a flowing of gases from one zone into the other the pressure at both ends of the constricted region 7 is adjusted to the same height. By means of sealing steam or gas introduced through line 22 into the constricted region 7 this adjusting may be supported.

Steam flows from the vaporization zone 4 through the constricted region 8 into the gasification zone 3. Into the latter the pulverulent or finely granular combustible, for example brown coal or hard coal are fed below the roof-like installation 10. The constricted region 8 is dimensioned in such a way that the speed of the steam flowing through it prevents the dust entering by way of the roof-like installation 10 from falling down into the vaporization zone. Below the roof-like installation 10 the steam mixes with the introduced coal dust which is approximately used in grain sizes of from e. g. 0 to 1 mm. The steam flows upward in countercurrent to the heat carrier with an initial temperature of, for example, 400 to 600° C. The steam charged with coal dust is hereby heated up until at temperatures above approximately 700° C. the gasification of the combustible with water vapor begins, the heat necessary for the endothermic reaction being supplied by the highly heated heat carrier. Due to the intensive turbulence an excellent exchange of heat and material takes place and thus a substantially total gasification of the combustible. The produced gas leaves the vertical shaft at the upper end of the gasification zone through the openings 23 and continues its flow to a dust separator 24 from which the residues of the gasification are discharged at 25 in a dry state. The temperature of the gas at this place is, for example, 800 to 1000° C. The tar liberated from the combustible is cracked to quite an extent and converted to gaseous or lower boiling hydrocarbons. The gas produced has approximately the composition of the conventional water gas with, for example, about 50% hydrogen and 40% carbon monoxide. Its composition depends in any particular case on the selected gasification conditions and on the kind of processed combustible. By keeping, for example, the gasification temperatures low a gas richer in hydrogen may be produced. Any cracking coke that may have formed is also more or less extensively converted with water vapor into gas. It also depends on the course of the gasification reaction, and especially also on the composition of the combustible, what specific quantities of heat carrier are required, and with what temperature the heat carrier leaves the gasification zone below. The hot gas flowing out of the gasification zone is cooled after passing through the dust separator 24, for example, in a waste heat boiler 26 to, for example, 200° C. The waste heat is, for example, used for the production of high pressure steam which flows out at 40 and may, for example, be used for driving the blowers and other machines and the like necessary for the process according to the invention. The gas flows through the washing cooler 27 which is supplied with water through line 28. This water serves for cooling as well as washing the gas for the purpose of further removing the dust. The waste water flows, for example, through a catch pot 29 to a collecting pit. The final cleaning of the gas from dust is accomplished by an electric filter 30, supplied with high voltage current at 31, or by similar cleaning devices. The cleaned water gas finally leaves the plant at 32. The combustible to be gasified is fed, for example, from any suitably located bunker via conduit 33 to the roof-like installation 10.

At its exit from the gasification zone 3 the heat carrier still has a temperature of about 500 to 600° C. The heat contained in it may be utilized for the production of steam for the gasification. For this purpose a steam circulating cycle is arranged through the zone 4 located in the lower part of the shaft in such a way that the steam is superheated to, for example, 500° C. by the heat carrier and subsequently sprinkled with water in a vaporizer 36 into which it flows via the discharge opening 35. The water vaporizes in the superheated steam whereby the temperature of the steam is reduced to, for example, 150 to 200° C. The water for the spraying is introduced via line 37, and the blower 38 fitted to the lower part of the vaporizer 36 maintains the steam circulating through the conduit 34 through which the stream flows to the roof-like installation 11 and further into the zone 4.

This method of vaporizing the water offers the advantage that it is very intensitive toward pollution. One may, therefore, use it with particular advantage for vaporizing the waste water and the gas liquor formed during the gasification and so utilize it again for the gasification process itself.

All the vapor that is newly being formed in the vaporizer 36 flows through the constricted region 8 upward into the gasification zone 3. The material serving as heat carrier leaves the furnace with a temperature of, for example, 300 to 350° C. The bucket wheel 13 ensures a gas tight closure and may also serve to regulate the speed, with which the heat carrier moves downward in the furnace. It is also possible to effect the gas-tight sealing and the regulation of the quantity of the discharged heat carrier by two devices operating independent from each other. The discharged heat carrier may be passed over a screen track 39, serving to sift out the dust and fine material carried along and brought to the bucket conveyor 14 which feeds the heat carrier back into the top of the furnace.

The heat still remaining in the heat carrier after the gasification may, moreover, also be used for other purposes as, for example, the preliminary drying of the combustible when, for example, operating with brown coal with a large content of water. In this way it becomes possible to utilize the water content of the combustible directly for its gasification. The reconduction of the heat carrier may also be done pneumatically instead of through the bucket conveyor 14.

The constrictions of the shaft facilitate keeping the gas restricted to the different zones. This is made possible by regulating the gas pressures at the lower and the upper ends of the constricted region, i. e. the pressure difference, in such a way that practically no gas can flow through the constricted region, provided one does not, for example, intend to let steam flow through the constriction, as between the third and second zone.

The heat of the gases leaving the gasification zone with a temperature of 800 to 1000° C. may subsequent to the separation of the dustlike residue of the gasification from the gases be utilized, for example, for the drying of the coal for the purpose of eliminating its cracking properties, or for the production of steam for meeting the energy requirements of the process, or the like. In the same manner one may, of course, also gasify the combustible with any kind of gas capable of reacting. One may also, for example, introduce methane containing waste gases of hydrogenation or Fischer-Tropsch synthesis into the gasification zone for the purpose of cracking the methane.

Liquid hydrocarbons may, possibly in a vaporized state, also be introduced into the upper part of the zone 3 together with the hot heat carrier or into the lower part of this zone together with the gas charged with dust and, in accordance with the respective requirements, the liquid hydrocarbons may be at high temperatures cracked or gasified to carbon monoxide and hydrogen or at medium temperatures to gaseous hydrocarbons by means of which the produced water gas may be carburated thus increasing its heating value.

The novel apparatus is suitable for the continuous production of water gas from pulverulent and finely granular combustibles. It may be operated with a high specific output since with high gas speeds and an accordingly favorable turbulence of the gas and the combustible an excellent interchange of material and heat is achieved. In place of the rectangular shaft shown in Fig. 1 a shaft with a circular cross section may be used.

The capacity of the novel apparatus is very high compared with that of a periodically operated water gas producer, since the process may be carried out continuously whereby the time is saved that with the conventional water gas producer is needed for the hot-blowing of the combustible bed, which requires up to 40% of the total operating time. A production of about 12,000 N m.³/h. of water gas and even more may be obtained by a gas producer according to the present invention with a diameter of 3.6 m.

*Example 2*

With the gasification of lumpy solid combustibles in a fixed bed by means of an oxygen containing gasification agent the composition of the latter is chosen in such a way that the heat generated by the reaction of the combustible with the introduced oxygen is sufficient to supply the heat required for the reaction of the water vapor with the carbon. Since the combustible and the gasification agent flow in countercurrent to each other the combustible is preheated to reaction temperature by the hot gases issuing from the reaction zone, and so a favorable thermal efficiency is achieved. With the conventional gasification of dust this is not the case, as has been mentioned before. The fuel is now carried by the gas in a continuous stream and the gas is discharged with the final reaction temperature, or even a higher one in case the oxygen addition is increased in order to obtain a complete burning out of the combustible.

By operating with the process according to the present invention it now becomes possible to carry out the gasification of dust under similar conditions as the gasification of solid lumpy combustibles. After the gasification agent charged with the combustible dust to be gasified is introduced into the hot heat carrier layer in the shaft it is first heated up while flowing upward in the shaft until its temperature reaches the ignition point and the gasification of the combustible takes place.

When keeping the ceramic material used as heat carrier immobile the exit temperature of the gas will be approximately 900 to 1200° C., as is usually the case with suspension gasification. Should, however, the heat carrier be kept in motion as is the case with the process according to the present invention, by withdrawing it at the bottom of the shaft and introducing it again at the top of the latter in the same quantity, heat is withdrawn from the produced gas and used for heating up the newly entering heat carrier which carries this heat into the lower lying zone. The heat carrier is suitably introduced into the shaft in such quantities that the exit temperature of the gas is lowered to such an extent that it is a little above the dew point. In this way heat is withdrawn from the gas flowing out of the reaction zone and transferred with the heat carrier into the reaction zone, or is used further for heating the gasification agent, or for the production of steam or the like. The circulation of the heat carrier is appropriately kept at such a speed that the heat losses of the discharged heat carrier have no unfavorable influence on the efficiency of the gasification process. To the same degree that the heat is withdrawn from the produced gas and transferred again to the reaction zone or the gasification agent respectively the consumption of oxygen, i. e. the heat production by the oxidation, may be reduced.

For this way of carrying out the process a shaft 51 is used which is encased by a sheet metal shell 54 and lined with refractory brickwork 55 in the interior. The shaft is subdivided into an upper gasification zone 52 and a lower zone 53 serving for the heating of the gasification agent and the production of steam. Roof-like installations 56 relieve the heat carrier filling the interior of the shaft, and also in the same way a roof-like installation 57 serving for the introduction of the combustible to be gasified. There is further in the zone 53 a roof-like installation 58 which is used for the introduction of the circulating steam or gasification agent. The gasification zone 52 is separated from the zone 53 by a constriction 59. At the upper end of the shaft there is a hopper 60 for feeding the heat carrier and at the lower end a bucket wheel 61 for discharging and conveying it over a chute 63 to the bucket conveyor 62. The chute 63 may be fitted with a screen track for sifting out the fine material. The heat carrier conveyed by the bucket conveyor 62 may be fed back to the hopper 60 via a slide 64. In this way the circulation cycle of the heat carrier is completed. The same kind of heat carrier as described in Example 1 may be used. The air used for the gasification; or the oxygen enriched air; or the oxygen, is sucked through line 65 by the blower 66 and introduced into the roof-like installation 58 in the lower part of the vaporization zone 53 after having been mixed with steam from line 67. The heat carrier leaving the gasification zone with a suitably high temperature through the constricted region 59 and entering the vaporization chamber 53 heats up the gasification agent. If a portion of the heated gasification agent is conveyed in a cycle through the openings 68 and a conduit 69 to a vaporizer 70 in which it is sprinkled with water issuing from line 72, the superheated gasification agent absorbs water vapor. The blower 71 fitted to the lower part of the vaporizer effects the circulation of the gasification agent. The introduced air; or oxygen enriched air; or the oxygen, is in this way enriched with water vapor to the extent necessary for the gasification of the combustible.

In a similar way as in Example 1 waste water and gas liquor may be vaporized in this apparatus thus precluding the difficulties experienced with their purification. The gas circulation cycle through the zone 53 and the vaporizer 70 may also be carried out solely with water vapor, and the air, or the oxygen, are introduced separately into the lower part of the gasifier. The gasification agent or the water vapor respectively heated in the zone 53 flow through the constriction 59 into the zone 52.

The pulverulent of finely granular combustible to be used for the gasification is stored in a bunker 73 from which it is fed in controlled quantities to the gasification zone below the roof-like insertion 57 by means of a screw conveyor 74. The gasification agent flowing with high speed upward through the constriction 59 prevents the dust from falling into the lower zone. Below the roof-like insertion 57 the gasification agent is charged with the combustible to be gasified. It flows now upward in countercurrent to the heat carrier. The combustion and gasification of the combustible with the gasification agent takes place within the heat carrier layer. The gas leaves the shaft through the opening 82 and enters the dust separator 75 from which the gasification residues, mainly ashes, may be discharged. In the washer cooler 76 the gas is sprinkled with water introduced through line 77 whereby it is cooled and purified. The waste water is discharged through the pot 78. The removal of the remaining dust takes place, for example, in an electric filter 79 which is supplied with high voltage current via insulator 80. The cooled and purified gas leaves the plant at 81 and is conveyed, after being subjected, if found necessary, to a further purification from, for example, sulfur, to where it is utilized.

With this embodiment of the invention it becomes possible to reduce the high gas exit temperatures occurring with the dust gasification of combustibles of 900 to 1200° C. to, for example, 200° to 400° C. and so achieve a considerable saving in oxygen and a better thermal efficiency.

In this case, too, the intensive turbulence of the gasification agent and the combustible within the heat carrier effects an increased reaction velocity and exchange of heat with a resulting high gasification capacity.

The zone 53 arranged below the zone 52 may also serve for other purposes of heat utilization as, for example, the drying of coal.

A combination of the application of the process of the invention according to the Examples 1 and 2 may be effected in such a way that the heat required for the gasification reaction is supplied in part by additions of heat from an outside source by means of a heat carrier, and in part by the burning of a combustible by oxygen.

*Example 3*

The low temperature distillation or coking of solid combustibles is effected by heating them to low, medium, or high distillation temperatures under exclusion of air. The heat may in this case be supplied directly—by means of internal heating with circulating hot gases—which is preferred when using lumpy noncaking combustibles, or indirectly by external heating on the outside in retorts or chambers, preferred with finely granular caking combustibles. Inside and outside heating may be used simultaneously.

In a well-known process solid combustibles which are to be burned under steam boilers for the production of energy are previously degassed, thus combining the production of energy and gas. For the sole production of gas by coking preferably caking bituminous coal is used as best suited combustible which yields a high-grade coke the sales value of which covers an essential part of the processing costs.

With the just mentioned combined production of gas and energy mainly combustibles have to be used which generally are not particularly suitable for either the one or the other coking process and yield only a low-grade coke which has to be sold for the same price, based on the respective heat values, as that of the initial coal, in order to prevent an unfavorable economy of the energy production. For this reason particular care has to be taken to achieve a high specific performance of the coking process.

For the burning of solid combustibles under a steam boiler preferably coal dust firing is used. In this case the combustibles have to be reduced to small pieces and ground.

With coke produced by previous degassing of the coal this process involves considerably higher costs on account of the increased wear and tear of the grinding mill and their lower production.

For the coupling of the production of gas and energy the process according to the present invention offers particular advantages.

The coal to be used according to the invention is broken up and ground in the usual way, and the produced coal dust is degassed and coked by conducting it through the layer of a highly heated heat carrier in a furnace shaft by means of a carrier gas. The shaft comprises an upper heating zone and a lower degassing zone. The heat carrier is heated up by hot combustion gases produced by the burning of gas, coke, or coal dust, or the like. The heat carrier enters the degasser in a highly heated state and passes downward in the shaft while the gas charged with coal dust flows upward in a countercurrent to it and is thus heated to temperatures high enough to cause degassing and coking of the coal.

With a given kind of combustible the quantity of heat carrier used and the height of its temperature determine the final temperature of the coking and so the gas yield, the composition of the gas, and the quality of the coke. When operating with high coking temperatures, and appropriately in countercurrent, the produced tar may be cracked to quite an extent so that mainly gaseous and lower boiling hydrocarbons are produced from it. As carrier gas suitably a portion of the gas produced by the degassing is used which is introduced into the heat carrier layer in a cooled or uncooled state and charged with pulverulent fuel. If additional formation of water gas and so an increased gas yield with a simultaneous adjustment of the heating value of the gas is desired, steam may be added to the carrier gas which, for example, may be produced in a third zone under further utilization of the heat of the heat carrier. The latter circulates in a cycle through the furnace.

The process makes possible the coking of coal dust with a high specific yield for the production of city gas or long distance gas while the also produced coke dust may be used for the production of energy. Whether the coke dust is burned in a combustion chamber of a boiler, or in a gas turbine or is applied for other heating purposes is of subordinate importance with regard to the invention and depends mainly on the local conditions prevailing.

By way of example a shaft 101 may be used which is encased by a gas-tight sheet steel shell 102 and lined on the inside with refractory brickwork 103. The shaft is subdivided into a heating zone 104 and a degassing zone 105. Both zones are separated from each other by a constricted region 106 for preventing the passage of gases from one zone to another, which may be attained, for example, by a suitable control of the pressures.

Through the constricted region 107 the carrier gas streams upward and prevents the combustible from falling downward. Roof-like installations 108 and 109 serve for the introduction of hot combustion gases and coal dust respectively. The heat carrier is fed into the furnace from a gas-tight hopper 110. It leaves the furnace through a bucket wheel or a similar device 111 and passes to a conveyor 112 which in this case consists of an injector-like device. The gas stream issuing from the nozzle of the injector conveys the heat carrier through the conduit 113 back to the hopper 110.

The heater is heated by hot combustion gases which, for example, are produced in a combustion chamber 114 by burning gas, coal dust, or oil, or the like, and pass through the conduit 115 and the roof-like device 108 into the shaft. The combustion chamber is fitted with a burner into which the combustible enters at 116 and the combustion air at 117. The hot combustion gases heat the heat carrier material to a temperature of about 1000° to 1400° C., for examples to 1200° C. They are cooled down hereby and leave the heater with a temperature of, for example 300° to 400° C. through opening 118. They pass then to the dust separator 119 and finally to the smoke stack 120 which is provided with a butterfly valve 121 for regulating the pressure conditions.

The highly heated heat carrier is conveyed through the constriction 106 into the degassing zone 105. Through this zone the carrier gas charged with the coal dust to be degasified flows upward in countercurrent to the heat carrier. The carrier gas consists of a portion of the produced gas which is forced by the blower 122 via line 123 through the opening 124 into the shaft. Through the constriction 107 the carrier gas flows into the lower part of the degassing zone where it is charged with the combustible entering through the roof-like insertion 109. The hot gas with a temperature of, for example, 900° C. leaves the furnace through the openings 125, from where it is conveyed through a communicating conduit 126 to the dust separator 127, from which at 128 the degassed coal dust may be discharged. While noncaking or only slightly caking coal may be fed directly to the heat carrier layer it may become necessary with strongly caking coal to subject the latter to any treatment for the purpose of decreasing its caking properties. For this preliminary treatment waste heat of the gases may be utilized. This may, for example, take place in a container 131 into which the coal dust from a bunker 129 by means of a screw conveyor 130 is conducted through the nozzles 132, and through which the gas coming from the separator 127 is conveyed. The gas stream carries the combustible to a succeeding separator 133 in which it is separated again from the gas. By means of the screw conveyor 134 and the conduit 135 the separated dust from the separator 133 is introduced below the roof-like device 109 into the degassing zone. From the separator 133 the gas continues its flow to the washer cooler 140 in which it is sprinkled with water from the line 141 while the waste water leaves through the pot 136. A further purification of the gas takes place, for example, in an electric filter 137. Through the conduit 138 the degassing gas is conveyed to further utilization. The blower 122 draws a portion of the gas produced by the degassing from the conduit 138 in order to convey it back to the degassing zone as carrier gas.

By the three examples with the accompanying Figs. 1 to 3 furnaces are described and diagrammatically illustrated in which the different installations are present only in single units. If larger production is required the cross section and the height of the shaft have to be increased correspondingly. This involves the disadvantage that the different installations also are increased in width and height whereby the flowing properties are impaired and the charging of the gas with dust is made more difficult. With large furnace shafts it is therefore appropriate to design the shaft with a rectangular cross section and to subdivide it into several compartments of limited dimensions in which the flowing conditions are more easily controllable. If several compartments of like construction are placed side by side and the enclosing brickwork, and the sheet metal shell outside around several compartments, a multiple compartment furnace is formed. The width of the compartments may, for example, be 0.5 m., but may also be 1 to 2 m. and more.

The compartments themselves are provided with common collecting and distributing devices for the introducing and discharging of the gas and the heat carrier. An advantageous design of furnaces for large productions comprises two multiple compartment furnaces placed side by side at a certain distance from each other thus forming together a double-shaft furnace. A common combustion chamber and common collecting and distributing devices for the gas are installed in the space between the two shafts, and in some cases in connection with common dust charging and removing devices for both furnace shafts.

This arrangement is more fully explained by Fig. 4 showing diagrammatically the cross section of a furnace with four compartments and by Fig. 5 showing the cross section of a double-shaft furnace with four compartments each.

151 and 201 are the gas-tight sheet metal shells, 152 and 202 the refractory brickwork linings of the furnace shafts 153, 203 and 204 which are subdivided into four compartments. The dot-and-dash lines represent no actual walls but only the boundaries of the different compartments. 154 and 205 are the chambers for the common introduction and distribution channels for the gases from and to the different compartments, 155, 156, 206 and 207 are the connecting conduits to the channels 154 and 205 leading to and from the not shown blowers and the attached devices. The inlets and exits of the compartments to the collecting chambers 154 and 205 may be provided with installation as, for example, butterfly valves for the uniform distribution of the gases to the compartments and in them. In place of an outside combustion chamber in which the hot combustion gases for heating the circulating heat carrier are produced the combustion may also take place directly in the separtate compartments, especially when burning gas or dust as combustible. For the purpose of adjusting the desired temperature of the hot combustion gases appropriately a corresponding quantity of surplus air or cold gas, preferably cooled down reconducted combustion gas is admixed to the hot combustion gases in the combustion chamber or after it. It is possible to avoid the introduction of cold gases for the purpose of lowering the temperature of the combustion gases before their introduction into the heat carrier entirely or partly by retarding the combustion in the heat carrier layer. This retarding of the combustion may be effected by stepwise feeding of the combustibles or the air of combustion and causes already before the termination of the combustion a transfer of heat from the hot combustion gases to the heat carrier so that the highest possible combustion temperature is lowered. With furnace shafts having several compartments care has to be taken that every compartment is supplied with the same quantity of heat carrier having the same size of granules. This may be attained by the use of conventional devices for feeding and discharging the heat carrier.

As compared with the known "fluidized technique" dust gasification or dust degassing according to the invention offers the great advantage that it is carried out in a countercurrent with high temperature differences and that the load of the reaction chamber may be varied in far greater limits than is the case with the known "fluidized technique," since the latter in order to maintain the fluid-like state of the combustible bed is forced at low loads to operate with gas circulating in a cycle and at high loads not to exceed the upper speed limit in order to avoid a carrying-along of the combustible.

The process according to the invention is not limited to the purposes mentioned in the examples. It may be used to great advantage in all cases where pulverulent or finely granular material is subjected to a thermal process involving heat exchange or interchanges of material and heat, e. g. for the manufacture of activated carbon, the reduction or oxidation of metallic compounds, the drying of organic or inorganic material, condensation reactions, in which pulverulent or fine grained solid substances are present or are formed, catalytic hydrogenation processes, for example the hydrogenation of carbon monoxide to hydrocarbons or hydrocarbons and oxygen containing hydrocarbon compounds in presence of catalysts, especially nickel, cobalt or iron catalysts, the catalysts being applied in finely divided condition and in a moving state, or for similar processes.

Intensive turbulent motion of the materials to be treated with the gas serving as conveying and, if necessary, also as reaction agent, in a chamber filled with a heat carrier, effects an excellent heat exchange and, if required, an interchange of material. A temperature distribution suitable for the process may be attained within the chamber by an appropriate conduction of the heat carrier and the gases charged with the substance to be treated. The simultaneous or subsequent separation of the heat carrier from the treated material may be achieved by an appropriate choice of the grain size and the specific weight of the heat carrier, of the material to be treated, of the composition of the gas and its speed.

What we claim is:

In the method for the gasification of solid carbonaceous fuel at elevated temperature, the improvement which comprises passing a substantially contiguous mass composed of from granular to lumpy inert heat carrier bodies downward through a reaction zone, passing a steam suspension of solid finely divided combustible material upward through said zone through the interspaces between said heat carrier bodies in counter-current contact therewith, said heat carrier bodies being passed downward through said reaction zone at a temperature sufficient to effect endothermic gasification reaction between said carbonaceous fuel and steam in said interspaces, thereafter passing said heat carrier bodies after passage through said reaction zone downwardly through a vaporizer zone in contact with water vapor for the production of superheated steam, spraying the superheated steam with water for the production of additional steam, and passing at least a portion of the steam produced upwardly through said reaction zone carrying the finely divided carbonaceous material suspended therein.

References Cited in the file of this patent

UNITED STATES PATENTS

| Number | Name | Date |
| --- | --- | --- |
| 1,899,887 | Thiele | Feb. 28, 1933 |
| 1,977,684 | Lucke | Oct. 23, 1934 |
| 2,376,564 | Upham et al. | May 22, 1945 |
| 2,393,636 | Johnson | Jan. 29, 1946 |
| 2,418,673 | Sinclair et al. | Apr. 8, 1947 |
| 2,447,306 | Bailey et al. | Aug. 17, 1948 |
| 2,455,915 | Borcherding | Dec. 14, 1948 |
| 2,473,129 | Atwell | June 14, 1949 |
| 2,521,195 | Wheeler, Jr. | Sept. 5, 1950 |
| 2,592,377 | Barr et al. | Apr. 8, 1952 |
| 2,602,019 | Odell | July 1, 1952 |
| 2,631,921 | Odell | Mar. 17, 1953 |